E. C. FRISK & E. C. ANDERSON.
UTENSIL KNOB.
APPLICATION FILED OCT. 2, 1914.
1,142,691.
Patented June 8, 1915.
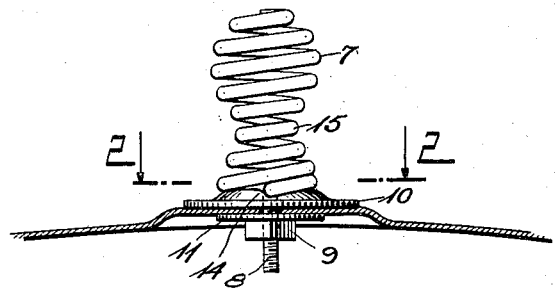
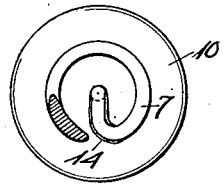
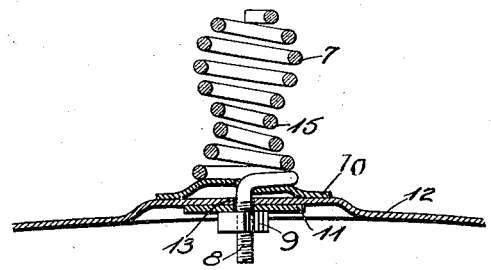
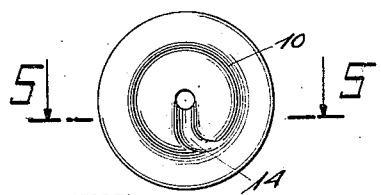
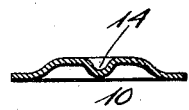
WITNESSES
INVENTORS
Enos C. Frisk
Edward C. Anderson
BY
ATTORNEYS

UNITED STATES PATENT OFFICE.

ENOS CORNELIUS FRISK AND EDWARD CHRISTIAN ANDERSON, OF SOMERSET, WISCONSIN.

UTENSIL-KNOB.

1,142,691.  Specification of Letters Patent.  Patented June 8, 1915.

Application filed October 2, 1914. Serial No. 864,674.

*To all whom it may concern:*

Be it known that we, ENOS C. FRISK and EDWARD C. ANDERSON, both citizens of the United States, and both residents of Somerset, in the county of St. Croix and State of Wisconsin, have invented a new and Improved Utensil-Knob, of which the following is a full, clear, and exact description.

The invention relates to knobs for use with cooking utensils and the like, and has reference more particularly to a device fashioned from an elongated, spirally disposed member and means for attaching said member directly to the utensil or body.

The object of the invention is to provide a simple, inexpensive and durable knob which can be used with cooking vessels or other utensils, which is so formed that it can be readily gripped and held to manipulate the utensil or part thereof with which the knob is associated, to which the heat from the utensil will not be easily transmitted, so that the user will not burn his fingers in grasping the knob, which can be readily attached to any utensil or part thereof, which will not work loose, which, being formed of metal, will last as long as the vessel itself, and which will not detract from the appearance or add materially to the weight of the utensil.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views, and Figure 1 is a vertical section of a part of a utensil having an embodiment of our invention attached thereto; Fig. 2 is a horizontal section on line 2—2, Fig. 1; Fig. 3 is a vertical section through the knob on line 3—3, Fig. 1; Fig. 4 is a plan view of the washer; and Fig. 5 is a vertical section on line 5—5, Fig. 4.

Before proceeding to a more detailed explanation of our invention, it should be clearly understood that the structure herein disclosed is an improvement over our Patent No. 1,099,033, that the knob itself is fashioned from wire or other suitable elongated material, is bent into spiral form of any desired proportions, and shaped so that it will afford a convenient grip. The upper part of the knob proper is enlarged relative to the intermediate portion thereof, as clearly shown in the drawing, for the purpose of making the intermediate part flexible, so as to reduce the stress on the part of the knob directly engaged with the utensil or cover therefor.

Referring to the drawings, the knob shown comprises a body 7 of spirally wound wire, the lower extremity of the wire being disposed co-axial with the spiral and threaded, as shown at 8, and whereat it receives a nut 9. This threaded end extends through the two washers 10 and 11 disposed at each side of the utensil wall 12, the latter being provided with an opening 13 through which the threaded end 8 of the body 7 passes.

The dished washer 10 is an inverted concave washer which has a depression 14 on its convex surface. The depression is made to conform to the irregular bottom of the body 7 whereby when the threaded end is drawn down by the nut 9 it compresses the inverted concave washer, bringing the whole bottom surface of the knob against the convex portion of the washer and the flange part of the washer against the wall 12 of the vessel, rendering the fastening of the knob very rigid and minimizing any tendency of the knob to work loose from the wall. The washer, being concave, is resilient and therefore, acts as a lock washer.

It will be noted from Figs. 1 and 2 that the most flexible part of the knob formed by the body 7 is the intermediate or narrower portion 15 about which the knob is rocked to and fro in service due to the rigid connection of the body of the knob, with the washer, to the wall 12 of the utensil. This intermediate part 15 relieves any stress that may otherwise be applied to the threaded end 8 of the body 7 of the knob, and, in consequence, no rupture or break can take place in said threaded stem, as no stress of any kind is transmitted thereto except that of maintaining the knob tight against the wall of the utensil. The wall of the utensil where the knob is to be attached is preferably raised outwardly so as to stiffen that part of the body of the utensil.

From the foregoing description, taken in connection with the accompanying drawings, the advantage of the construction and operation of the device shown will be readily understood by those skilled in the art to which the invention pertains; and while we have described the principle of operation, together with the device which we now consider to be the best embodiment thereof, we desire to have it understood that the device shown is merely illustrative and that such changes may be made when desired as are within the scope of the appended claims.

Having thus described our invention, we claim as new and desire to secure by Letters Patent:

1. A device of the class described comprising a knob body formed from a spirally disposed elongated member having one end thereof threaded and disposed coaxial with the body, a concave washer adapted to engage the threaded end and having on its convex surface a depression to conform to the portion of the coil adjacent the threaded end, said threaded end being adapted to engage a utensil wall with the washer between the wall and the body, and a nut engaging the threaded end whereby the knob with the washer is secured to the utensil wall.

2. A device of the class described comprising a knob body formed from a spirally disposed elongated member having one end thereof threaded and disposed axially with the body, the threaded end being adapted to engage a utensil wall, a dished washer, the convex surface of which forms a seat for said knob body on the utensil wall, and a nut for the threaded end whereby the knob body and washer are secured to the utensil wall.

In testimony whereof we have signed our names to this specification in the presence of two subscribing witnesses.

ENOS CORNELIUS FRISK.
EDWARD CHRISTIAN ANDERSON.

Witnesses:
H. A. LAGRANDEUR,
C. H. CALLANAN.

Copies of this patent may be obtained for five cents each, by addressing the "Commissioner of Patents, Washington, D. C."